US007261481B2

(12) United States Patent
Lane et al.

(10) Patent No.: US 7,261,481 B2
(45) Date of Patent: Aug. 28, 2007

(54) UV FEATURE ILLUMINATION

(75) Inventors: David Michael Lane, Sammamish, WA (US); Thomas Patrick Lennon, Seattle, WA (US)

(73) Assignee: Microsoft Corp., Redmond, WA (US)

( * ) Notice: Subject to any disclaimer, the term of this patent is extended or adjusted under 35 U.S.C. 154(b) by 119 days.

(21) Appl. No.: 11/155,421

(22) Filed: Jun. 17, 2005

(65) Prior Publication Data

US 2007/0002019 A1    Jan. 4, 2007

(51) Int. Cl.
*B41J 5/00* (2006.01)
(52) U.S. Cl. ............... 400/472; 400/479; 400/473; 341/170
(58) Field of Classification Search ........ 400/472–496; 345/168–172; 341/22
See application file for complete search history.

(56) References Cited

U.S. PATENT DOCUMENTS 5,401,927 A * 3/1995 Lundell et al. ............. 200/314
6,196,738 B1 * 3/2001 Shimizu et al. ............. 400/490
6,462,941 B1 * 10/2002 Hulick et al. ............... 361/683
6,917,005 B2 * 7/2005 Sasaki ........................ 200/314
2001/0038381 A1 * 11/2001 Griencewic ................. 345/163
2003/0202339 A1 * 10/2003 Oross et al. ................. 362/33

FOREIGN PATENT DOCUMENTS

EP         1189130    * 3/2002
JP      2004047412    * 2/2004

* cited by examiner

*Primary Examiner*—Daniel J. Colilla
*Assistant Examiner*—Marissa Ferguson-Samreth
(74) *Attorney, Agent, or Firm*—Banner & Witcoff, Ltd.

(57) ABSTRACT

In an aspect of the present invention, methods and systems for providing an input device are disclosed. In an aspect of the present invention, the input device includes a symbol and a UV light source is provided to direct UV light on the symbol. The symbol includes an UV excitable compound. In an aspect of the invention, the UV light from the UV light source is directed onto the symbol with a light pipe. In operation, the UV light causes the symbol to glow so that the symbol is visible in a darkened environment.

18 Claims, 9 Drawing Sheets

UV FEATURE ILLUMINATION

BACKGROUND

The provision of symbols on an input device such as a keyboard is known. To allow for visibility of the symbols in a darker environment, some inputs devices include a backlight that illuminates the symbols and allows the user to determine which key, for example, provides the desired functionality. While a system of illuminating symbols is known and somewhat effective, some users may not prefer the look and the resultant effects of using such a system.

SUMMARY

In an aspect of the present invention, an electronic device is configured to include a symbol containing an UV excitable compound. The symbol is positioned so as to be visible to a user when excited. An UV light source, such as an UV light emitting diode, may be activated so as to direct UV light on the UV excitable compound, the effect being that the symbol starts to glow. In an aspect of the present invention, the shape of the symbol provides information to a user of the electronic device. In an aspect of the present invention, the UV light source is pulsed at a frequency sufficient to cause the symbol to continue to glow while allowing for a reduction in the consumption of power because of a reduced duty cycle.

DRAWINGS

The present invention is illustrated by way of example and not limited in the accompanying figures in which like reference numerals indicate similar elements and in which.

DETAILED DESCRIPTION

Aspects of the present invention are useful for illuminating one or more features on an input device through the use of UV light. In different aspects of the invention the input device may be stand-alone type device or the may be part of a larger system.

It is noted that various connections are set forth between elements in the following description. It is noted that these connections in general and, unless specified otherwise, may be direct or indirect and that this specification is not intended to be limiting in this respect.

Figure 1:
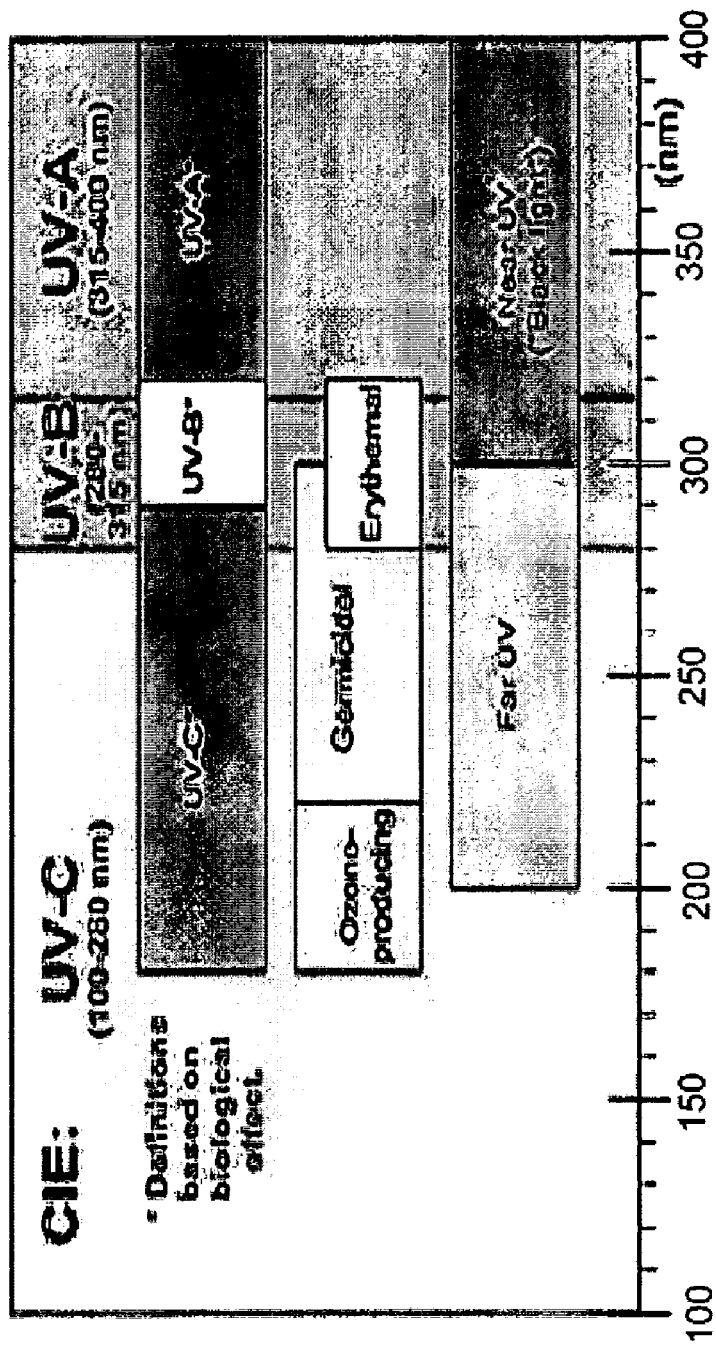
FIG. 1 illustrates a graph of different wavelengths of ultraviolet light.

Before describing various aspects of the present invention in greater detail, FIG. 1 illustrates a graphic depiction of ultraviolet (UV) light. In general, UV light is light that has a wavelength that may range from about 100 nanometers to about 400 nanometers. Typically, UV light is not visible to the human eye but contains energy that may be used to excite chemical compounds. Some of the chemical compounds that are excited by UV light glow when excited and these glowing compounds will be referred to as UV excitable compounds. Therefore, although UV light typically is not visible to the human eye, when directed onto a UV excitable compound the UV excitable compound will glow in a manner that is visible to the human eye.

Figure 2:
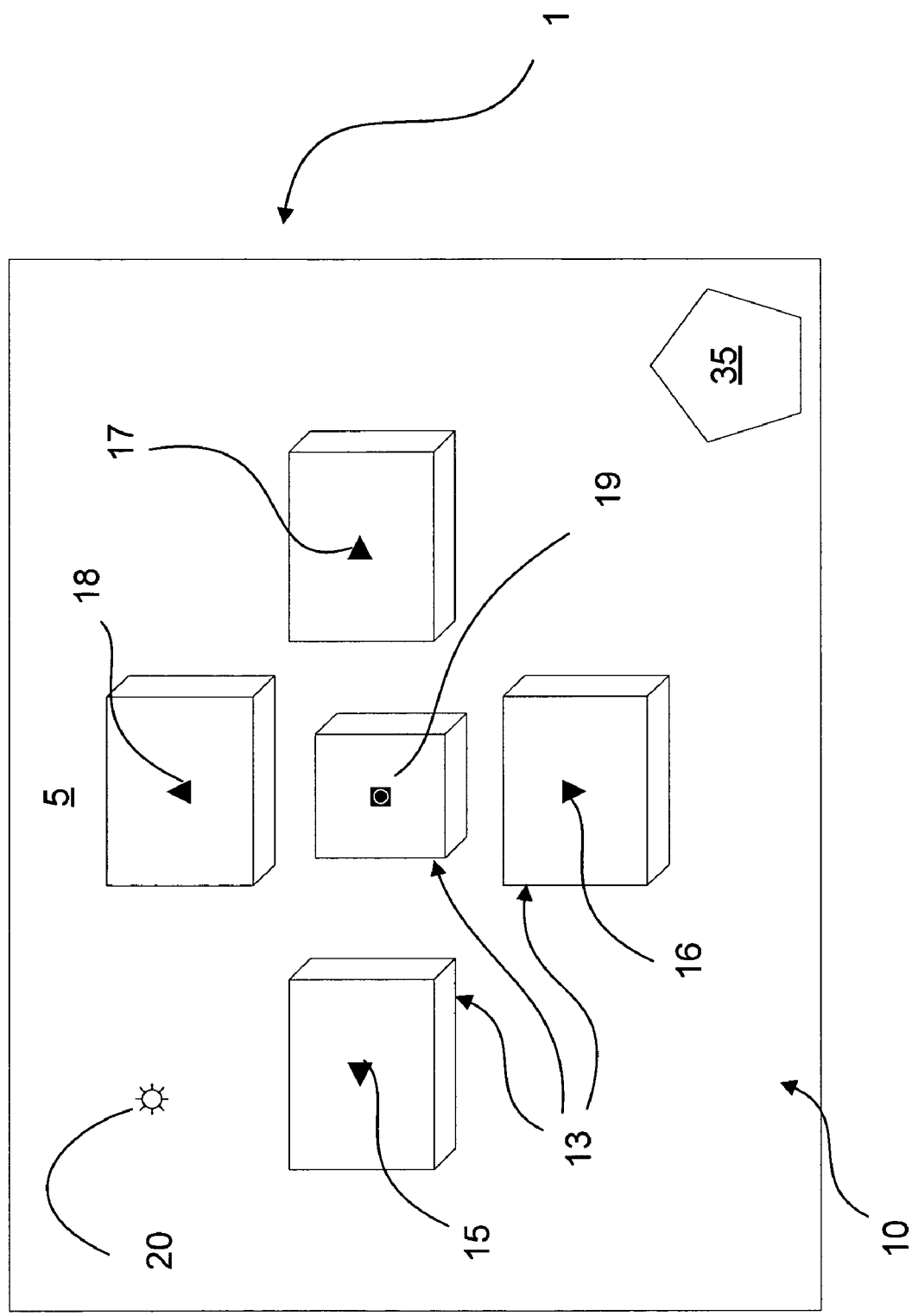
FIG. 2 illustrates an input device in accordance with an aspect of the present invention.

Turning to FIG. 2, an input device 1 is shown. As will be further discussed below, the input device 1 may be connected to, or may be configured to be connected to, a computing device and may be in a variety of configurations. As illustrated, the input device 1 includes a housing 5. The housing 5 includes a outer surface 10 and one or more keys 13 and the housing 5 is configured to enclose electronic components (not shown) of the input device 1 within the housing 5.

As shown, the housing 5 includes five keys 13, which are examples of input switches. In an alternative embodiment (not shown), the housing may include more or less than five input switches. Furthermore, the input switches, such as the keys 13, may be provided in a variety of shapes and orientations. Input switches may be actuated by being depressed, rotated, translated, touched or otherwise actuated so as to cause or provide an input. For example, an input switch may comprise a capacitive-based touchpad. Numerous other configurations of input switches are possible.

As depicted, symbols 15-20 are provided on the housing 5. The symbols 15-20 include an UV excitable compound that may be excited by a UV light source (not shown). The symbols 15-20 may be painted on the surface of the input device 1 with an UV paint, an UV ink, or may be molded into the housing 5 or positioned under a layer the housing 5 as will be discussed below. While five symbols are depicted, more or less symbols may be provided. In an alternative embodiment, only one of the symbols will include the UV excitable compound. In another alternative embodiment, some portion of the symbols 15-20, the portion being greater than one of the symbols and less than all of the symbols, will include the UV excitable compound.

For example, in an embodiment only the symbol 20 includes a UV excitable compound. When sufficient UV light is directed onto the symbol 20, the symbol 20 will glow. Thus, when the symbol 20 is excited it will be visible, even in a darkened environment. It should be noted that symbol 20 may be invisible or barely visible when not excited by UV light. Thus, the symbol 20 may be configured to be nearly invisible until excited by the UV light.

In an alternative embodiment, the symbol 20 could be visible when illuminated with light that did not include UV wavelengths of light and could glow when excited by UV light. In such an embodiment, the symbol 20 could be visible to the user during normal lighting conditions present in, for example, an office environment and could also be visible in a darkened room when the UV light source excited the UV excitable compound contained within the symbol 20.

While the above discussion has been in regard to symbol 20, additional symbols, such as symbols 15-19, could also include the UV excitable compound and could therefore glow in response to being excited by the UV light source.

Figure 3:
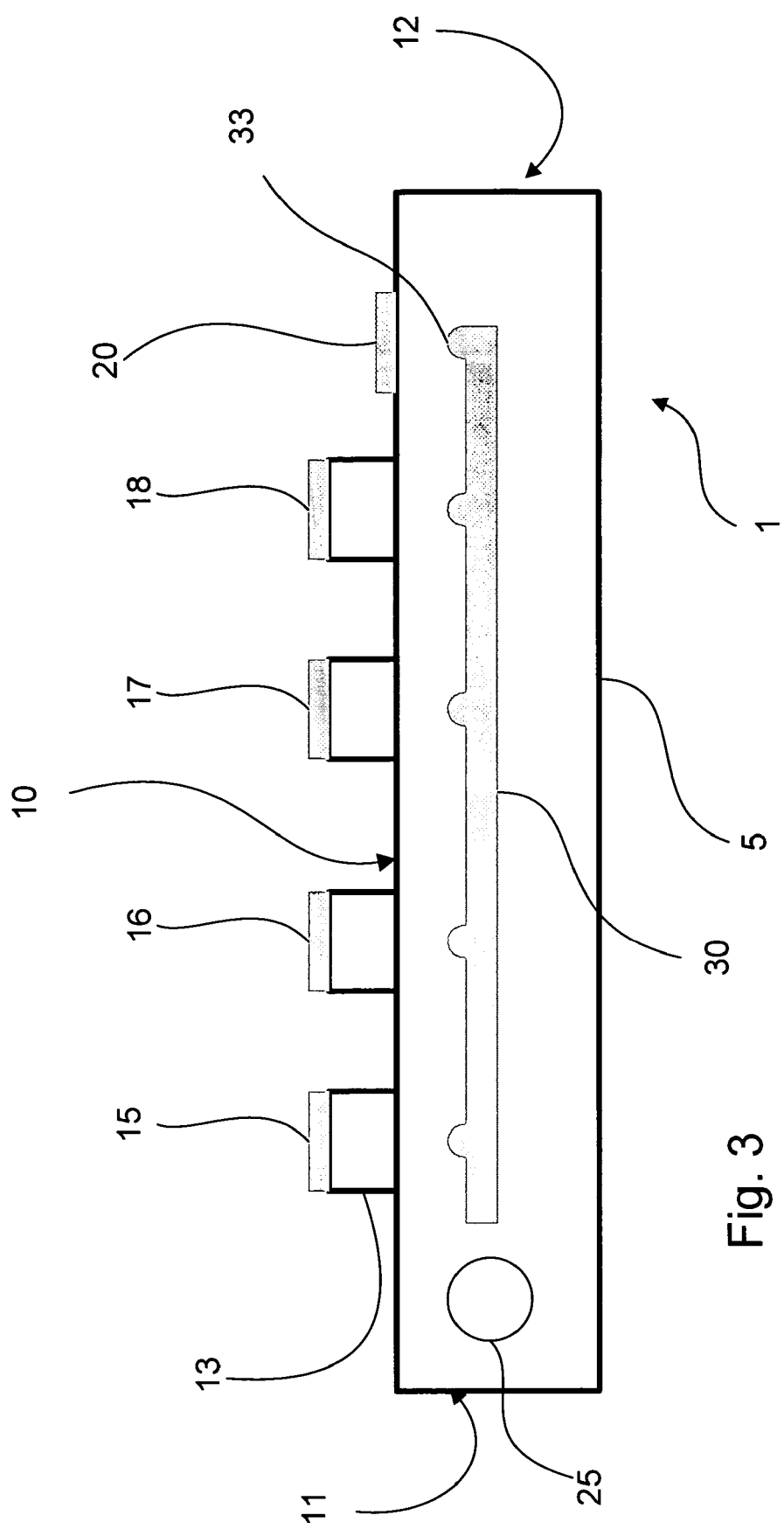
FIG. 3 illustrates an alternative input device in accordance with an aspect of the present invention.

Turning to FIG. 3, an alternative embodiment of the input device 1 is disclosed. The input device 1 includes the housing 5, which includes the surface 10 and the keys 13. Mounted on the keys 13 are the symbols 15-18. In addition, symbol 20 is mounted on the surface 10. It should be noted that while four keys 13 are shown, more or less keys 13 may be provided. In addition, while five symbols are depicted, some other number of symbols may be provided.

A UV light source 25, which may be, for example, an UV light emitting diode (LED) or a fluorescent light, is mounted in the housing 5. As the mounting of light sources is known in the art, the components used to support the light source are not shown. UV LEDs are useful because they provide a relatively compact mechanism for providing UV light. Fluorescent lights are useful because they provide a relatively efficient mechanism for providing UV light.

A light pipe 30 is also depicted mounted within the housing 5. As depicted, the light pipe 30 includes a plurality of dimples 33. The dimples 33 allow the UV light to be directed onto the symbols so that the symbols may glow as discussed above. Thus, the light pipe 30 allows the UV light source 25 to be in optical communication with the symbols.

It should be noted that the UV light emitted from the dimples 33 must be able to reach the symbols in order to cause the symbols to glow. In an embodiment the housing 5 allows the UV light to pass through the housing 5 so as to reach the symbols. Thus, the housing 5 may include a translucent section that is aligned with the symbols. In addition, if there are additional components positioned below the symbol, such as is common in keyboards and other related types of input devices, these components (not shown) need to provide a passageway for the UV light to reach the symbol.

In the embodiment depicted in FIG. 3, the symbols are placed on top of the keys 13. Methods of placing the symbols on the keys include using paint or ink that contains an UV excitable compound. In an embodiment, the ink or paint may be translucent such that the symbol is invisible or nearly invisible when the UV light source 25 is not exciting the symbols.

Figure 5A:
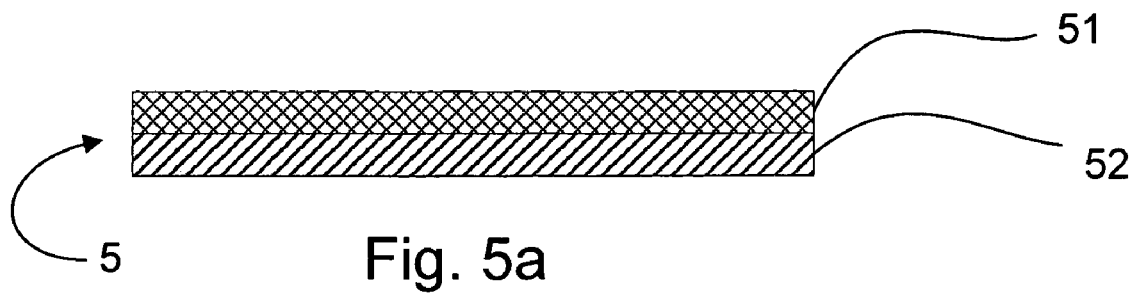
FIG. 5a illustrates an exemplary cross-sectional view of a housing according to an aspect of the present invention.
Figure 5B:
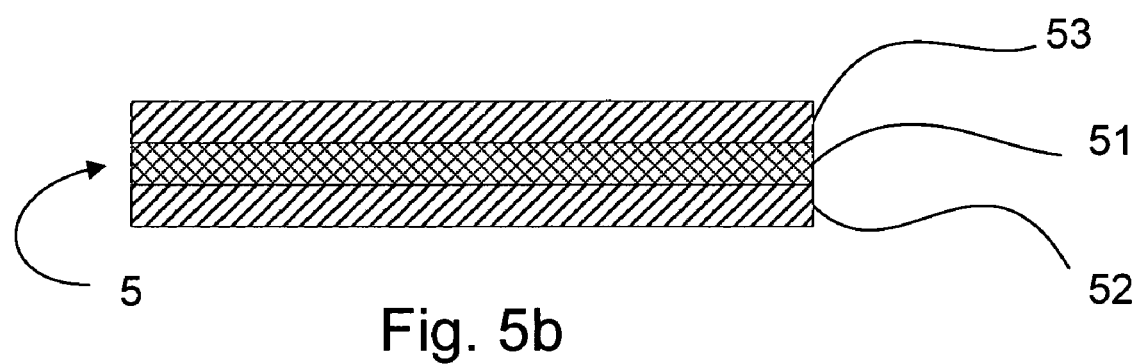
FIG. 5b illustrates an exemplary cross-sectional view of a housing according to an aspect of the present invention.
Figure 5C:
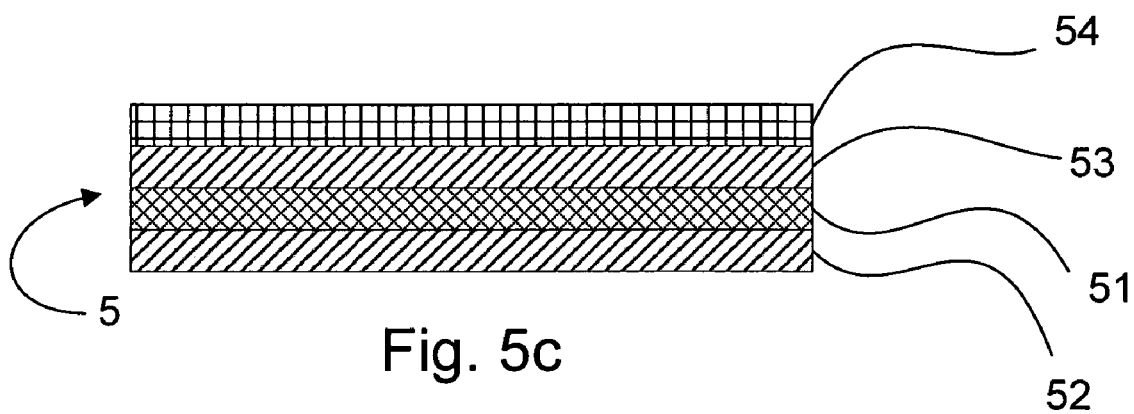
FIG. 5c illustrates an exemplary cross-sectional view of a housing according to an aspect of the present invention.

For example, embodiments of a cross section of the housing 5 are provided in FIGS. 5a-5c. FIG. 5a illustrates an embodiment with a symbol layer 51 mounted to a first housing layer 52. As depicted, UV light could be directed through the housing layer 52 so as to excite the symbol layer 51. In such an embodiment, the housing layer 52 would be configured to allow the UV light to pass through the housing layer 52. In an alternative embodiment, the UV light could be provided to the symbol layer 51 in a direct manner. For example, the UV light source (not shown) could be positioned above the symbol layer 51 so as to shine directly on the symbol layer 51.

FIG. 5b illustrates another embodiment in accordance with an aspect of the present invention. The symbol layer 51 is positioned between a first housing layer 52 and a second housing layer 53. The first and second housing layers 52, 53 could be, for example, a clear resin and the symbol layer 51 could be applied on the first housing layer 52 and then the second housing layer 53 could be applied on top of the symbol layer 51. As discussed above, the UV light may be directed through the first housing layer 52 so as to excite the symbol layer 51 but could also be directed through the second housing layer 53.

FIG. 5c illustrates another embodiment in accordance with an aspect of the present invention. In addition to the layers discussed in FIG. 5b, a film layer 54 is also provided. The film layer 54 is configured to block UV light. Thus, UV light may be directed through the first housing layer 52 so as to excite the symbol layer 51. However, UV light passing through the symbol layer 52 will be blocked by the film layer 54. In this manner, the UV light will be substantially prevented from passing through the housing 5.

As can be appreciated, the arrangement of the layers depicted in FIGS. 5a-5c may be modified. For example, the housing layer 52 in FIG. 5b may be omitted. Similarly, in FIG. 5c the housing layer 52 or the housing layer 53 may be omitted. Furthermore, additional layers (not shown) may be added as desired.

Regarding the UV excitable compound provided in the symbol layer 51 of FIG. 5a for example, the UV excitable compounds may be a fluorescent dye, a phosphorescent dye and other similar chemicals. The UV excitable compound may also be a combination of different UV excitable compounds. As is known, different UV excitable compounds have different responses to being excited by UV light. Phosphorescent compounds, for example, tend to continue to glow for a period of time after the UV light ceases to excite the phosphorescent compound but are not as bright as fluorescent compounds. Other UV excitable compounds, such as fluorescent compounds, tend to glow more brightly when excited and in a wider variety of colors as compared to phosphorescent compounds but quickly fade once the UV light ceases to excite the fluorescent compound. Thus, different effects can be provided depending on the needs and desires of the end user and the manufacture.

It should be noted that different symbols may be configured with different types of UV excitable compounds. For example, fluorescent dyes tend to provide some of the most vibrant and brilliant colors and can be configured to glow in colors ranging from orange, green, white and blue. By blending different dyes one could obtain variations in color. Thus, for example, the symbols 15-18 of FIG. 3 could include a first UV excitable compound having a first response to being excited by the UV light. The symbol 20 could include a second UV excitable compound with a second response to being excited by the UV light. In an embodiment, the first response would be to glow blue and the second response would be to glow green. Numerous variations are possible, such as varying the color the symbol glows in response to the UV excitement or varying the time of continued glowing in response to the UV excitement or some combination of the two.

The ability of UV excitable compounds, such as phosphorescent compounds, to continue to glow after the UV light stops exciting the UV excitable compound provides an additional benefit. Returning to FIG. 3, for example, the symbol 20 may be omitted while symbols 15-18 may be configured to include a phosphorescent compound. In such an embodiment, the UV light source 25 could be cycled on and off at some frequency sufficient to continue to excite the phosphorescent compound in the symbols 15-18 so that the symbols 15-18 glowed in a visible manner. As can be appreciated, this may allow for a means of displaying symbols in a more efficient manner than convention backlighting methods allow.

It should be noted that while the light pipe 25 of FIG. 3 is depicted as a planar structure with dimples, other light pipe designs are possible. For example, a fiber optic cable with nicks aligned with symbols may be used or a simple optic cable may be used. In addition, other methods of directing light may be used, such as the use of mirrors or lenses, in a known manner. As methods of directing light are known in the art, additional details regarding such methods are not discussed herein.

Figure 4:
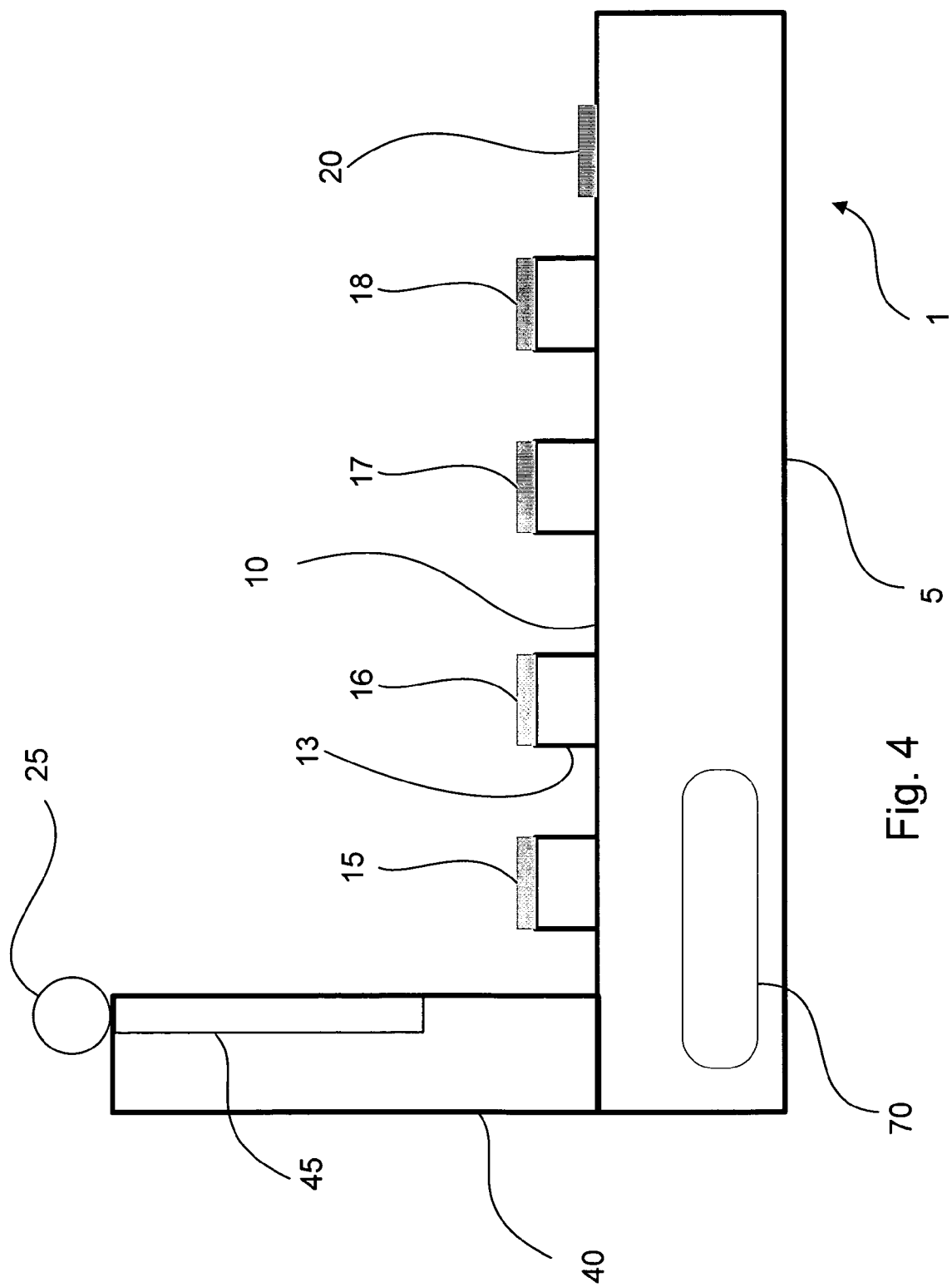
FIG. 4 illustrates another alternative input device in accordance with an aspect of the present invention.

Turning to FIG. 4, an alternative embodiment in accordance with an aspect of the present invention is disclosed. As in FIG. 3, the input device 1 includes the housing 5 that includes the keys 13 and the surface 10. Mounted on the housing 5 are the symbols 15-18, 20. In contrast to FIG. 3, however, the UV light source 25 is mounted so as directly shine on the symbols 15-18, 20. As depicted, the UV light source is mounted on a second housing 40 that may include an output device 45. An example of the output device 45 includes a display. It should be noted that the location of the UV light source 25 may vary. For example, the UV light source could be mounted below the output device 45. In addition, it should be noted that the keys 13 could be configured to be flush with the surface 10 or could even be somewhat below the surface 10.

In an embodiment, the second housing 40 could be attached to the first house 5 via a hinge connection (not shown). The second housing 40 could also be eliminated and the UV light source 25 could be mounted on a projection (not shown) or could be directed to the symbols 15-18, 20 through reflection of the UV light (also not shown). Thus, numerous variations to the housing 5 and/or the housing 40 are possible.

FIG. 4 thus illustrates an embodiment of a computing device in accordance with an aspect of the present invention. To illustrate additional components that may be provided in a computing device, FIGS. 6 and 7 provide schematics of potential computing devices.

Figure 6:
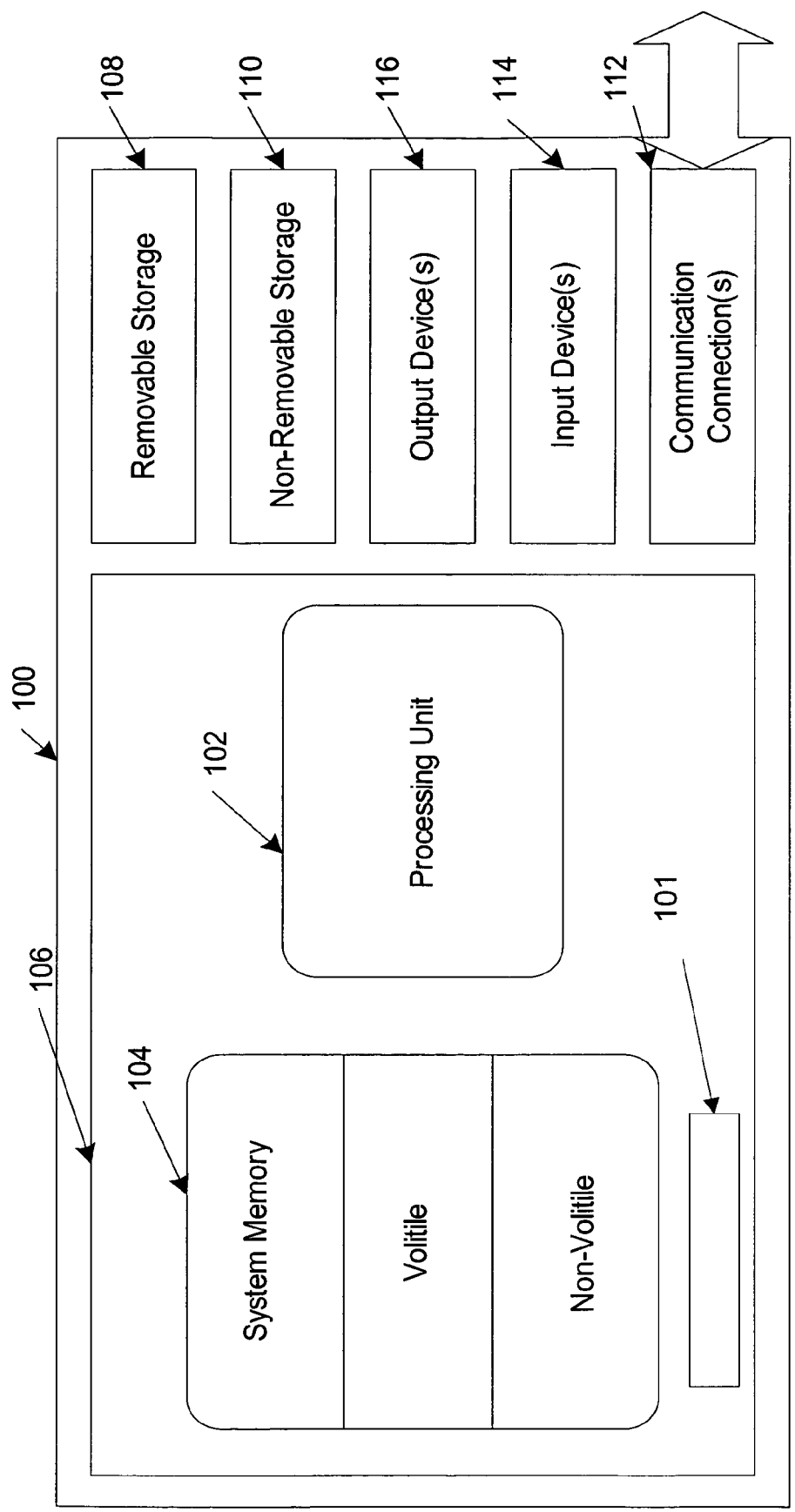
FIG. 6 illustrates an exemplary computing device according to an aspect of the present invention.
Figure 7:
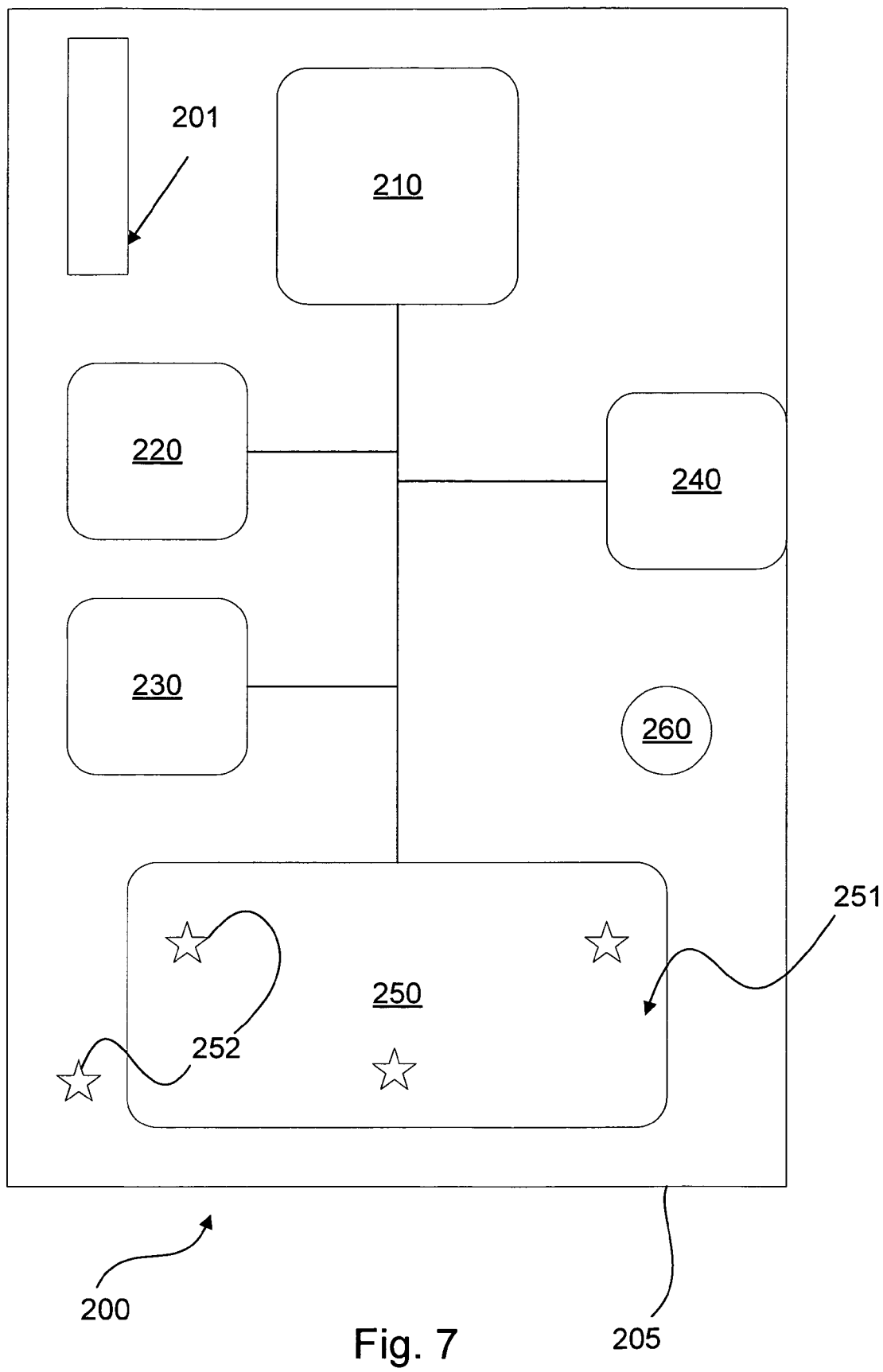
FIG. 7 illustrates an exemplary computing device according to an aspect of the present invention.

With reference to FIG. 6, an exemplary system for implementing the invention includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 7 by line 106. Additionally, device 100 may also have additional features/functionality. For example, device 100 may also include additional storage (removable and/or non-removable) including, but not limited to, magnetic or optical disks or tape. Such additional storage is illustrated in FIG. 6 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Device 100 may also contain communications connection(s) 112 that allow the device to communicate with other devices. Communications connection(s) 112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Device 100 may also have or be connected to one or more input device(s) 114 such as a keyboard, a mouse, a pen, a voice input device, a touch input device, a 5-way navigation switch, a video camera, etc . . . Output device(s) 116 such as a display, one or more speakers, a printer, etc . . . may also be included or connected to the device 100. All these devices are well know in the art and are not discussed at length here.

In an embodiment, device 100 may be a portable device with a power source 101, the power source 101 comprising a battery. Alternatively or in addition, the power source 101 may obtain power over a wire (not shown). As portable devices can be used in a variety of environments, such as dark rooms, it is beneficial to provide a means of illuminating the input device when it would be otherwise difficult to see. As noted above, portable devices with enclosed power sources tend to be limited by the amount of energy capable of being provided with the portable device, therefore it is beneficial to illuminate the input device in a power efficient manner.

FIG. 6 illustrates an example of a suitable computing system environment 100 on which an aspect of the present invention may be implemented. The computing system environment 100 is only one example of a suitable environment and is not intended to suggest any limitation as to the scope of use or functionality of the invention. Neither should the computing environment 100 be interpreted as having any dependency or requirement relating to any one or combination of components illustrated in the exemplary operating environment 100.

FIG. 7 depicts a schematic of an alternative embodiment of a computing device suitable for use with an aspect of the present invention. A portable device 200 is shown with a battery 201. The portable device 200 will include a housing (not shown). Mounted to the housing may be a display 210, a processor 220, a memory unit 230, a communications connection 240, and an input device 250. The processor 220 may include any type of unit capable of processing instructions. The input device 250 may include an input switch, such as a translatable button or a pressure-sensitive pad or the like. It is noted that the phrase "mounted to," unless otherwise noted, refers to either direct or indirect mounting.

The communications connection 240 may be a connection for a wire but preferably includes a transmitter and a receiver, which may be combined in a single component, so as to enable wireless communication. As depicted, the various components of the portable device 200 are connected together. This connection may be physical, logical, local or remote.

As depicted, the portable device 200 includes a UV LED 260. The UV LED 260 is configured to excite a symbol, such as the symbols 252 on the surface 251 of the input device 250. The UV LED 260 may be configured to shine directly on the symbols 252 (as shown in FIG. 4) and as the UV light emitted from the UV LED 260 typically will be in a range not visible to the human eye, the symbols 252 may glow without a visible source of illumination. In an alternative embodiment, the UV LED 260 may be mounted inside of the input device 200 and the UV light from the UV LED 260 will be configured to excite a symbol, such as the symbols 252. In an embodiment, a light pipe (as shown in FIG. 3) may be provided to direct the UV light from the UV LED 260 to the one or more symbols 252. The light pipe, while not required, may allow for more efficient provision of the UV light on the one or more symbols 252. Thus, a potential benefit of the present invention is that effective lighting of the input device may be provided with less LEDs than are typically required for normal backlighting.

As discussed above, the light pipe may be configured so as to illuminate more than one symbol at a time. In an alternative embodiment more than one light pipe and more than one UV light source may be used so as to selectively illuminate symbols.

Figure 8:
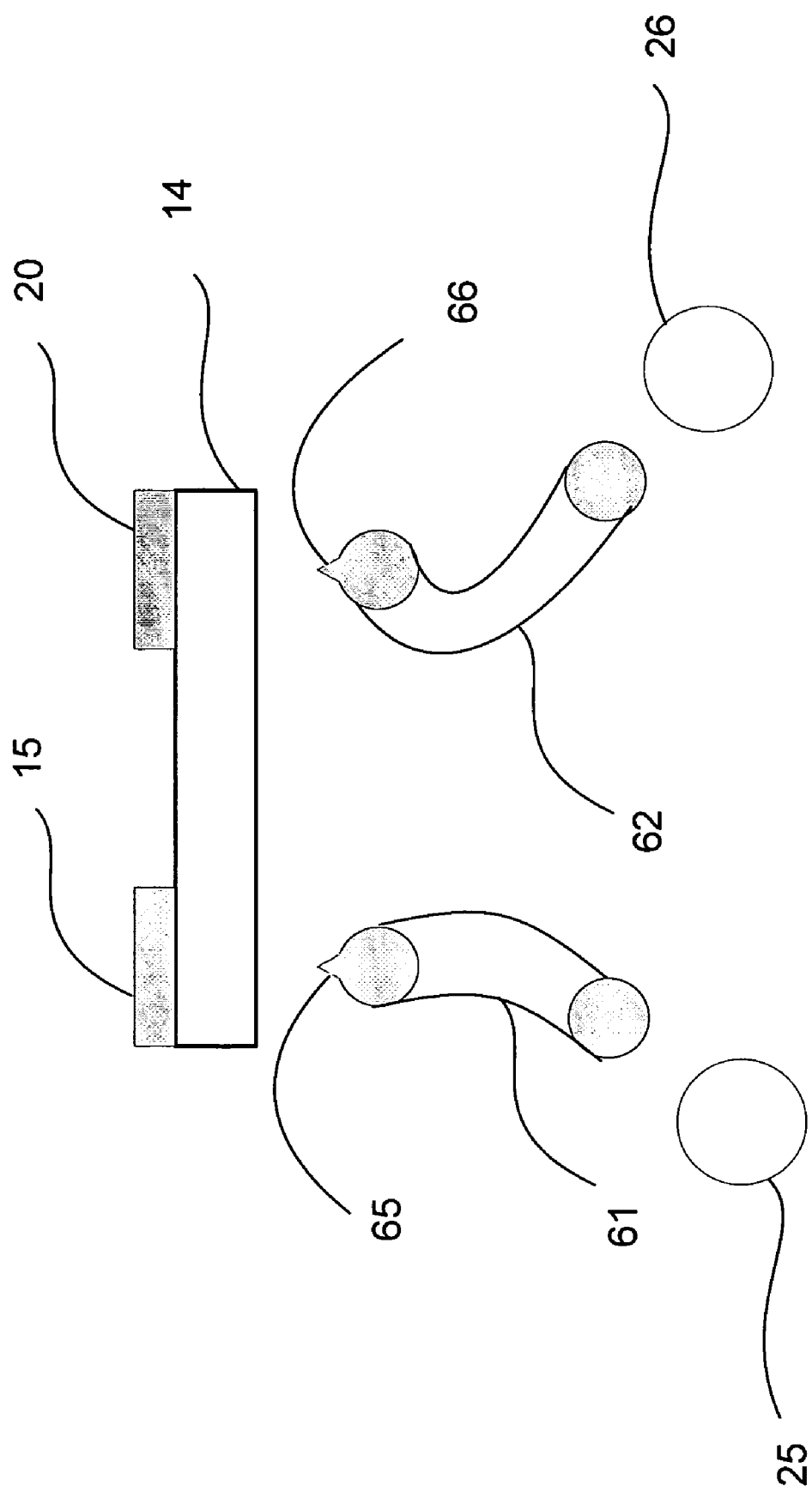
FIG. 8 illustrates a schematic of an exemplary input device according to an aspect of the present invention.

FIG. 8 depicts an embodiment of using a first and second UV light sources to selectively excite symbols. An input switch 14 includes the first symbol 15 which includes a first UV excitable compound and the second symbol 20 that includes a second UV excitable compound. In an embodiment, the first symbol glows orange when excited by UV light and the second symbol 20 glows blue when excited by UV light. The light pipe 61 provides optical communication between the first UV light source 25 and the first symbol 15. Similarly, the second light pipe 62 provides optical communication between the second UV light source 26 and the second symbol 20. In an embodiment, the first and second light pipes 61, 62 include a first nick 65 and a second nick 66, respectively, the nicks 65, 66 configured to direct light on the appropriate symbol.

Thus, as depicted in FIG. 8, the input switch 14 includes two symbols. In an embodiment, the symbols 15, 20 may be selectively illuminated. In an embodiment, the first symbol could indicate a first mode and the second symbol could indicate a second mode. Depending on the size of the input switch 14 and the size of the symbol, additional symbols may be provided on the input switch 14.

As can be appreciated, in an input device with a plurality of symbols provided on a plurality of keys, variations may be provided. For example, a first set of keys could have symbols that glow in a first color and a second set of keys could have symbols that glow in a second color. The first and second sets could include some or all or the same keys or could be completely separate keys. Additional sets could also be added, depending on the number of modes that were desired.

In addition, as noted above, the symbols may be configured to be visible in light without UV wavelengths. Thus, combinations of UV light and non-UV light may be used to provide additional variations. As an example, a symbol could look blue in non-UV light and glow orange in UV light. Thus, a single symbol could be used in multiple modes.

It should be noted that the one or more symbols may range in size and shape. For example, returning to FIG. 3, a symbol may be a logo similar to symbol 20 or may be a section or all of the surface 10. In an embodiment, a first side 11 and a second side 12 of the housing 5 could be configured to glow in different colors in response to UV light. Thus, the term symbol is intended to be defined broadly unless otherwise stated.

As noted with respect to FIG. 4, it is possible to use direct UV light to cause the symbols to glow without any light other than the light from the glowing symbols to be visible to the user. This can provide advantages where the use of traditional illumination would interfere with the user's night vision or be otherwise undesirable.

Figure 9:
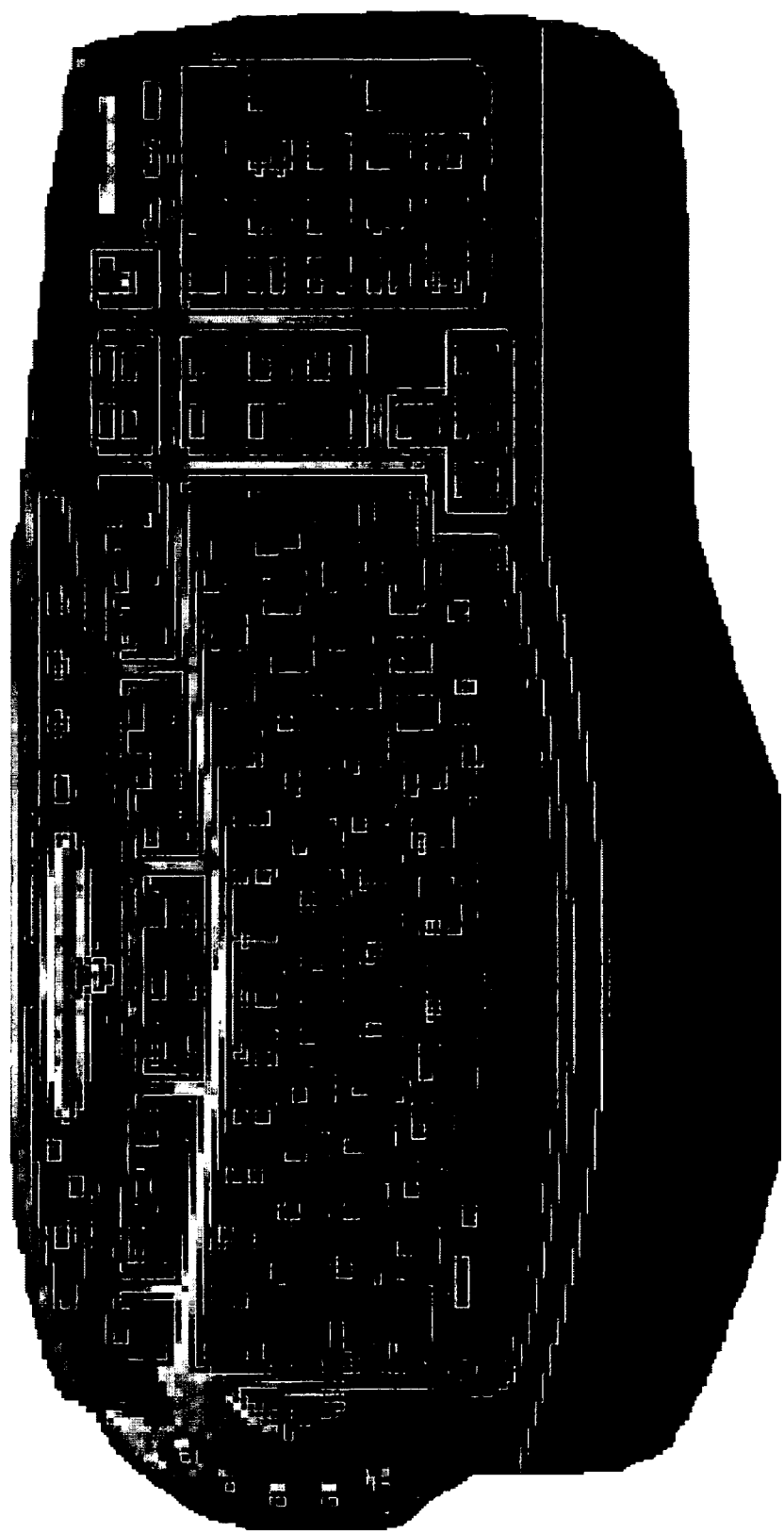
FIG. 9 illustrates an exemplary keyboard according to an aspect of the present invention.

It should also be noted that the input device 1 of FIG. 2 could be provided in a variety of configuration, such as a full sized QWERTY keyboard or a QWERTY keyboard for a laptop, or a miniature keyboard such as is typically provided with cell phones and Pocket PCs. The input device may also include a battery source 70, such as depicted in FIG. 4. FIG. 9 illustrates a possible keyboard design with more than 80 keys. The full sized keyboard could be a battery powered and could be wireless. Numerous other keyboard configurations are possible.

Full sized keyboards and laptop keyboards typically have more than 80 keys. The ability to illuminate a substantial number or all of the keys in a power efficient manner is highly valuable when the illumination source is powered through a battery provided with the device. If desired, however, a lesser number of keys such as a single key may be illuminated so as to reduce the amount of power being used. In addition, the number of keys being illuminated may vary according to the mode of use.

To aid in ensuring the visibility of the symbols, a sensor 35 (FIG. 2) may be provided for detecting the amount of visible light. When the visible light drops below a certain level, the sensor 35 could provide a signal that causes, either directly or indirectly, the UV light source to be activated so that the symbols on the keys remain visible.

It should be noted that any type of symbol on any type of control can be excited. For example, a touch pad could include one or more symbols that would not ordinarily be visible but would glow when excited by the application of UV light. Thus, the application of symbols on input devices is not limited to placement on keys or buttons.

The UV light may be selectively provided so as to illuminate the symbols as desired. For example, the one or more symbols could be illuminated during a particular mode, such as during start up, or in response to an application or any other type of mode.

As discussed above, more than one source of UV light may be provided. For example, a combination of two or more of following may be used: a backlighting UV light source, a reflected UV light source and a directly illuminating UV light source. The different methods of delivering UV light may be provided for example by one UV light source but may also be provided by more than one UV light source.

Furthermore, a combination of two or more different UV excitable compounds may be used. For example, a phosphorescent compound and a fluorescent compound could be combined to form a symbol. Thus, the symbol would glow more brightly when continuously illuminated by UV light but would still continue to glow when subjected to a pulsed or cycled UV light. This combination could allow the user or manufacture to select the level of illumination along with the amount of power being consumed. Furthermore, by selective configuration of the compounds, the color of the symbol could change depending on the duty cycle of the UV LED. For example, a continuous duty cycle of the UV LED could cause the symbol to glow a first color and by pulsing the UV LED at least a second color could be provided.

While the above discussion has been related to controls and associated symbols, in another aspect of the present invention a symbol may be illuminated for the purpose of displaying a trademark or some other indicia that is desired to be displayed. Furthermore, a unique and easily recognizable design may be created with more than one UV excitable compound so that the design glows in different colors and intensities. As the UV excitable compounds glows in response to UV light, the display of the design can be related to modes of operation and may be selectively illuminated.

For example, an entire side of a device could be configured to glow, either continuously or in response to a signal provided by the device. Variations of the above example are possible such that more than one design may be provided on a single device or that a single color may illuminated.

As can be appreciated, the look of a glowing UV excitable compound is somewhat unique. The ability to provide a unique appearance may be useful for a particular brand or for a model or platform within a brand. As is known, an important part of marketing new devices is to provide an attractive appearance along with excellent functionality. Thus, this ability may provide a signature look that may be highly valuable and commercially appealing.

The present invention has been described in terms of preferred and exemplary embodiments thereof. Numerous other embodiments, modifications and variations within the scope and spirit of the appended claims will occur to persons of ordinary skill in the art from a review of this disclosure.

We claim:

1. A input device for use with a computing device, the input device comprising:
   a housing with at least one input switch;
   a first and second symbol mounted on the housing, the first symbol including a first UV excitable compound and the second symbol including a second UV excitable compound, wherein the first and second UV excitable compounds are configured to respond differently to excitation by UV light; and
   a UV light source, the UV light source configured to excite the first and second symbols.

2. The device of claim 1, wherein the UV light source comprises a UV light emitting diode.

3. The device of claim 2, wherein the input device further comprises a light pipe, the light pipe placing the UV light emitting diode in optical communication with the symbol.

4. The device of claim 2, wherein the first symbol is configured to glow when, in operation, the UV light emitting diode is cycled on and off at an effective frequency.

5. The device of claim 1, wherein the input device comprises a keyboard and the at least one input switch comprises a first key and a second key.

6. The device of claim 5, wherein the first symbol is mounted on the first key and the second symbol is mounted on the second key.

7. The device of claim 5, wherein the input device further comprises a transmitter and a receiver, the input device configured in operation to communicate through wireless communication with another device.

8. The device of claim 1, wherein the first and second symbol are mounted the input switch and are configured so as to be selectively illuminated.

9. A computing device for providing an illuminated input device, the computing device comprising:
   a housing;
   a processor unit within the housing, the processor unit connected to a memory;
   an input device associated with the housing, the input device connected to the processor unit, the input device including a input switch;
   an output device associated with the computing device;
   a first symbol on the housing, the first symbol including a first UV excitable compound;
   a second symbol on the computing device, the second symbol including a second UV excitable compound; and
   a UV light source mounted to the housing, the UV light source configured in operation to excite the symbol.

10. The device of claim 9, wherein the UV light source comprises a UV light emitting diode contained within the housing.

11. The device of claim 10, wherein the input switch comprises a first layer, a second layer and a third layer, wherein the symbol is provided in the second layer and the second layer is positioned between the first and third layer.

12. The device of claim 9, wherein the first symbol is an indicia on a surface of the housing.

13. The device of claim 9, wherein the second symbol is provided on the input switch.

14. The device of claim 9, the computing device further comprising a light pipe, the light pipe configured to provide optical communication between the UV light emitting diode and the first symbol.

15. A keyboard, comprising:
   a housing with a first key and a second key;
   a first symbol mounted on the first key, the symbol including a first UV excitable compound;
   a second symbol mounted on one of the first and second key, the second symbol including a second UV excitable compound; and
   an UV light source configured, in operation, to excite the symbol.

16. The keyboard of claim 15, further comprising
   a battery; and
   a transmitter.

17. The keyboard of claim 15, wherein the second symbol is mounted on the second key.

18. The keyboard of claim 15, wherein the second symbol is mounted on the first key, wherein, in operation, the first and second symbols are selectively excited.

* * * * *